TAPE TRANSPORT SYSTEM

Filed Oct. 19, 1966

4 Sheets-Sheet 1

Morgan, Finnegan, Durham & Pine
ATTORNEYS.

July 22, 1969 R. J. KEOGH 3,456,858

TAPE TRANSPORT SYSTEM

Filed Oct. 19, 1966 4 Sheets-Sheet 2

Morgan, Finnegan, Durham & Pine
ATTORNEYS.

July 22, 1969 R. J. KEOGH 3,456,858

TAPE TRANSPORT SYSTEM

Filed Oct. 19, 1966 4 Sheets-Sheet 3

Morgan, Finnegan, Durham & Pine
ATTORNEYS

INVENTOR

Morgan, Finnegan, Durham & Pine
ATTORNEYS.

United States Patent Office 3,456,858
Patented July 22, 1969

3,456,858
TAPE TRANSPORT SYSTEM
Raymond J. Keogh, Huntington, N.Y., assignor to Photocircuits Corporation, Glen Cove, N.Y., a corporation of New York
Filed Oct. 19, 1966, Ser. No. 587,800
Int. Cl. G06k 13/26, 13/18
U.S. Cl. 226—51 8 Claims

ABSTRACT OF THE DISCLOSURE

A bi-directional magnetic tape transport in which the magnetic tape is conveyed around a pair of guide rollers and across a magnetic transducer. A continuous belt drive frictionally engages the tape and conveys it around the guide rollers and across the transducer. The drive belt is symmetrically tensioned to maintain the desired frictional engagement with the tape and to maintain the desired contact pressure between the transducer and the tape regardless of the direction of tape movement. Two such transports can be combined in a closed tape loop recording and reading system.

This invention relates to a tape transport system and more particularly to a high performance bi-directional tape transport system. In addition this invention relates to an intermittent, bi-directional transport system for conveying tape in accordance with the demands of a dual recording and reading system.

To substantially eliminate distortion and to obtain high performance characteristics in magnetic tape systems and the like, the tape must be conveyed across the read-write heads in a carefully controlled fashion. The frictional contact between the tape and the drive capstan arrangement must be sufficient to eliminate slippage and the resulting underspeed operation or deterioration of acceleration-deceleration characteristics during the starting and stopping intervals. The tape must also be maintained in direct operative contact with the read-write heads. In the past, systems have been developed wherein stationary pressure pads are used to maintain contact between the tape and the read-write heads and a pinch roller urged against a driven capstan roller is used to obtain the tape driving function. In such a system the tape is under tension since the driven capstan pulls the tape against the restraining force created by the pressure pads. In more sophisticated high performance systems the tape is maintained under controlled tension and the tape tension is used to maintain the proper contact with the read-write heads and the driven capstan roller.

The requirements on the tape transport system are particularly critical in digital computers where magnetic marks are recorded along one or more tape tracks of the tape at a typical density of 200 bits per inch. Hence, the distance between successive bits is approximately five thousandths of an inch (0.005″). For incremental operation, that is recording on a bit-by-bit or character-by-character basis, the transport system must be capable of accelerating the tape to running speed and thereafter capable of stopping the tape during a total tape displacement of less than 0.005″. Prior digital tape transport systems have usually included high inertia tape reels and therefore have required compensating low inertia buffer mechanisms in order to make incremental and bi-directional operation feasible. The low inertia buffer mechanisms often take the form of vacuum columns in which a tape loop is formed on each side of the capstan. As the tape is rapidly started and stopped the relatively slow action of the reel motor and reel is compensated for by appropriate changes in loop length within the adjacent vacuum column. The tape loops formed by the vacuum columns are also used to maintain the tape in balanced tension to maintain the desired contact between the tape and the magnetic heads and capstan. Mechanical tension arm arrangements are used to similarly provide balance loop tensioning and low inertia buffering. However, such buffer mechanisms and tensioning arrangements are space consuming, complex and costly.

It is therefore an object of this invention to provide a compact high performance tape transport system which effectively eliminates the need for vacuum columns and tensioning arms.

Another object of this invention is to provide a tape transport system which maintains the necessary frictional driving contact with the tape and the necessary operative contact between the read-write head and the tape without tensioning the tape.

Still another object of this invention is to provide an economical, bi-directional, incrementally operating tape transport system suitable for digital data systems.

In the tape transport system in accordance with this invention a drive belt is used to convey the tape into contact with and across the read-write head. The drive belt is maintained under tension and is disposed so that the belt tension urges the tape into contact with the read-write head as the tape is conveyed across the head. The belt drive is preferably symmetrically disposed relative to the head with the same frictional driving contact between the tape and the belt on one side of the head as the other thereby achieving a completely bi-directional system. Since the drive belt conveys the tape, instead of driving the tape from a particular point through a capstan roller, the tape is not placed under tension. In the illustrative embodiment the tape is a continuous freely distributed loop thereby eliminating inertia problems associated with tape reels.

The foregoing and other objects may be understood more fully from the following specifications which sets forth an illustrative embodiment of the invention. Although the invention is described principally in connection for use with a computer, the invention is nevertheless applicable to other types of recording and reading systems. The drawings are part of the specification wherein.

For illustrative purposes, the drive belt is shown as part of a capstan arrangement for a digital buffer data system including separate recording and reading systems. Incoming data is recorded via the recording system on a continuous length of tape as it arrives and data is retrieved from the tape either subsequently or simultaneously via the reading system. The recording and reading systems operate incrementally to record and read data on a character-by-character bases. Approximately 200 characters are recorded on an inch of magnetic tape and therefore, for proper incremental operation, the capstan arrangement of the recording system is capable of accelerating to running speed, recording a character, and coming to a stop, within .005″. Similar requirements are met with respect to the reading system.

Figure 1:
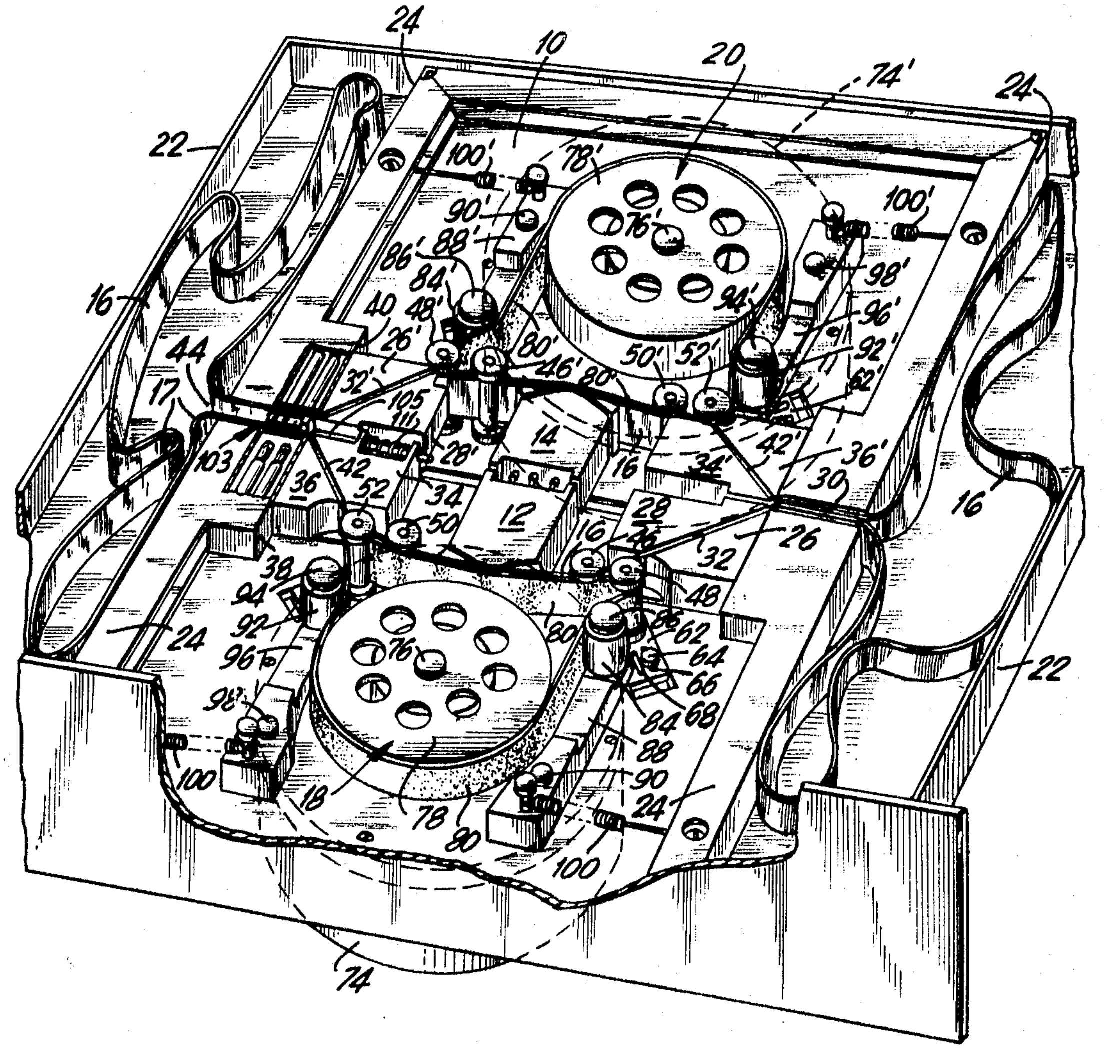
FIGURE 1 is a perspective view of a bi-directional tape transport system of the present invention used in connection with a dual digital reading and recording system.
Figure 2:
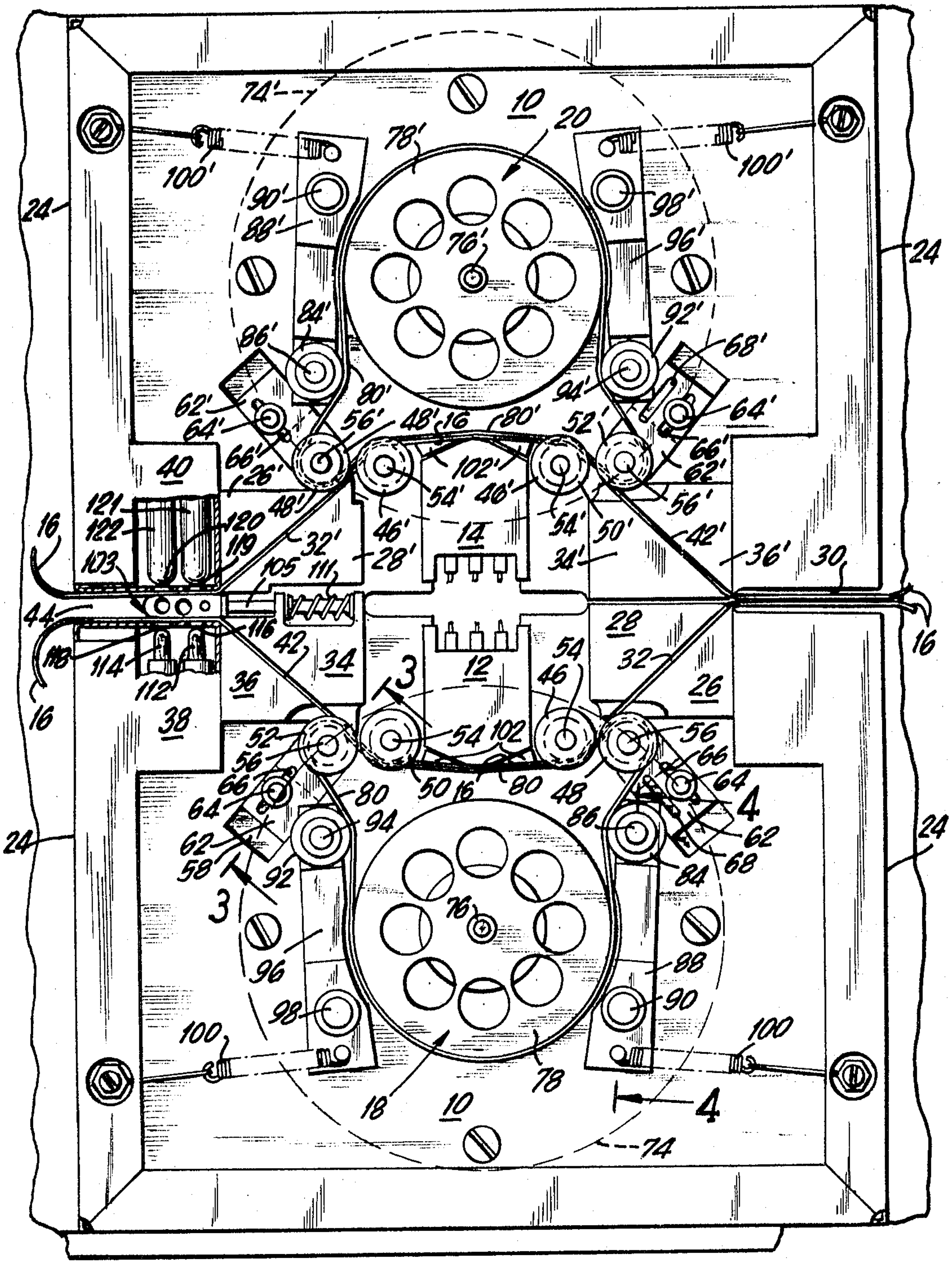
FIGURE 2 is a plan view of the tape transport system shown in FIGURE 1.

Referring to the drawings, and first to FIGURES 1 and 2, there is shown a tape deck 10 upon which an outwardly facing recording head 12 of the recording system, and a separate and opposing outwardly facing reading head 14 of the reading are mounted. Both heads 12 and 14 are disposed to contact a continuous length of tape 16 transported across each head by separate recording and reading tape transport systems 18 and 20 which are also mounted on tape deck 10. The distance between the heads 12 and 14 is as small as possible to minimize the length of tape which must exist therebetween, i.e. tape loop 17. About the perimeter of tape deck 10 is an upwardly extending tape confining rail 22, which together with an inner tape confining rail 24 extending upwardly from deck 10 in the area surrounding the tape drive systems, form tape storage areas in which the continuous length of tape 16 is freely distributed.

To facilitate transporting of the tape 16 from one side of the storage area to the recording head 12, the inner rail 24 and positioning blocks 26 and 28 define transport channels 30 and 32. Correspondingly, positioning blocks 34 and 36 and housings 38 and 40, together with the rail 24, form similar transport channels 42 and 44 from the record head 12 to the storage area on the other side.

Figure 3:
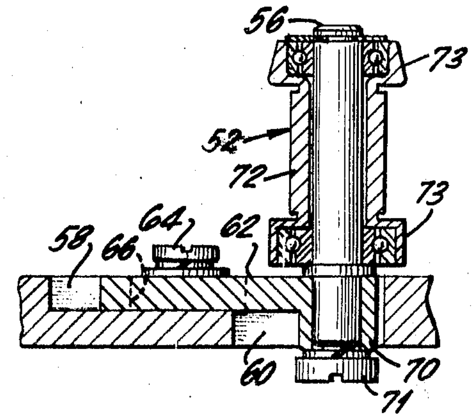
FIGURE 3 is a sectional view of a portion of the belt guide roller taken along the lines 3—3 in FIGURE 2.

Between transport channels 32 and 42 a pair of cooperating freely rotating guide rollers 46 and 48 are positioning on one side of recording head 12 and a similar pair of cooperating guide rollers 50 and 52 are symmetrically positioned on the other side of the recording head. Rollers 46 and 50 of each pair are journaled on shafts 54 secured to tape deck 10, and rollers 48 and 52 of each pair are journaled on shafts 56 which are adjustably secured to tape deck 10. As shown in FIGURE 3, for each adjustable roller assembly tape deck 10 includes a recess 58 and a contiguous bore 60. Each roller assembly includes a plate 62 slidably mounted in the recess 58 by means of a guide post in the form of a set screw 64 passing through a slot 66 in plate 62. As illustrated in FIGURE 1, one of the plates 54 can include an additional slot 68. Shaft 56 of each roller 48 and 52 is secured in a sleeve 70 depending from each plate 62 into the bore 60 by means of a screw 71. For guiding purposes and as best shown in FIGURE 3, each of the rollers 42, 44, 46 and 48 includes a central portion 72 and confining annular flanges 73 at the top and bottom of the roller.

The magnetic tape emerges from channel 32, then passes between rollers 46 and 48, across record head 12, between rollers 50 and 52 and thereafter enters channel 42. The record head 12 is positioned beyond the point of mere engagement with the tape 16 when taut between rollers 46 and 50 to provide approximately a 5° wrap angle of the tape around the head. This wrap angle is desirable since a larger wrap angle creates distortion in the recorded signals and a lesser wrap angle tends to increase tape wear.

The record tape transport 18 includes a motor 74 mounted beneath the deck 10 with its shaft 76 extending above the deck. Motor 74 is a high performance DC motor preferably of the printed circuit type including an armature with an annular array of printed conductors supported on a dielectric disk carrier. The armature of this motor does not include iron and therefore has a very low mechanical inertia, is essentially inductanceless, produces a high pulse torque, and has acceleration-deceleration characteristics which are linear with respect to applied current.

The record tape transport 18 includes a direct tape drive capstan arrangement having a pulley 78 secured to the free end of shaft 76 and a continuous drive belt 80 driven by the pulley 78 and positioned to frictionally engage the tape 16 in a non-sliding fashion. The drive belt is made from a suitable flexible material, such as rubber impregnated, woven polyester material, and has a width approximately the same as the width of tape 16.

The drive belt 80 passes around the outside of pulley 78 and guide rollers 48 and 52. Guide rollers 48 and 52 are located so that the drive belt 80 partially wraps around guide rollers 46 and 50 to provide the desired frictional contact between the tape 16 and the drive belt 80 as they pass around guide rollers 46 and 50 and across record head 12. The position of roller 48 is adjusted to provide free travel of the tape as it emerges from or enters channel 32 and the position of roller 52 is likewise adjusted to provide free travel of the tape as it enters or emerges from channel 42.

Figure 4:
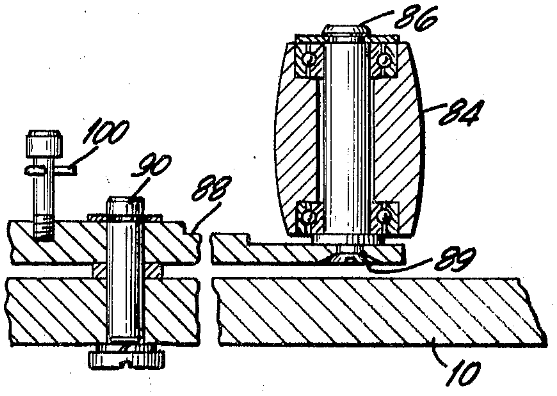
FIGURE 4 is a sectional view of the tensioning roller for the belt drive taken along the lines 4—4 in FIGURE 2.

A tensioning roller 84 is located outside the drive belt loop and engages the belt between pulley 78 and roller 48. Tensioning roller 84, as shown in FIGURE 4, is barrel shaped and is journalled on a shaft 86 which is secured to one end of a tensioning arm 88 by means of a flat head screw 89. The other end of the tensioning arm 88 is pivotally connected to tape deck 10 by means of a pivot pin 90. A second tensioning roller 92 engages drive belt 80 between pulley 78 and roller 52 and is likewise journaled on a shaft 94 secured to a second tensioning arm 96 which is similarly pivotally connected to the deck 10 by means of a pivot pin 98. Suitable springs 100 are connected to tensioning arms 88 and 96 and to rail 24 to urge tensioning rollers 84 and 92 toward one another to thereby provide balanced tensioning of the drive belt 78. Springs 100 are selected to provide the proper belt tension for maintaining the desired frictional contact between the belt and tape around rollers 48 and 52, and the desired contact pressure of the tape against head 12.

In some instances, there may be a tendency for the tape 16 to separate from the drive belt 80 in the areas between guide rollers 46 and 50 thereby forming a small tape loop on one side or the other of recording head 12. These small tape loops are undesirable since they alter the wrap angle of the tape relative to the head and, if permitted to build up, can jam the tape. A pair of small triangular wedges 102, constructed of non-magnetic material, are secured to the tape deck straddling the point of contact between the head and the tape to prevent the formation of these tape loops.

The read tape transport system 20 is identical to the record tape transport 18. Reference characters 26′ to 102′ designate the components in the read system corresponding, respectively, to reference characters in the record system.

In the read transport system tape 16 is advanced from the storage area at the left through transport channels 44 and 42′, between guide rollers 46′ and 48′, across read head 14, between guide rollers 50′ and 52′, through transport channels 32′ and 30 to the tape storage area of the right side. The transport capstan arrangement includes pulley 78′ coupled to the shaft 76′ of an associated drive motor and a belt 80′ which passes around pulley 78′ and the adjustably positioned rollers 48′ and 52′ to engage the tape 16 in the area between the inner pair of guide rollers 46′ and 50′. Rollers 84′ and 92′ secured to tensioning arms 88′ and 86′ provide balanced tensioning of the drive belt.

A plunger assembly and associated photoelectric circuits are utilized to control the minimum tape loop size so that the tape loop cannot be withdrawn from transport channel 44.

The plunger assembly includes a toop maintaining plunger member 103 which is dimensioned to fit loosely within channel 44 leaving room for free travel of the magnetic tape, that is room on one side for free travel of the tape emerging from or entering channel 42 and room on the other side for free travel of the tape emerging from or entering channel 32′. The free end of member 103 is rounded so the tape, when in the tight tape condition, can pass around the other end of the member with minimum friction. Several holes 104 can be drilled through member 103 to decrease the mass of the plunger assembly.

Figures 5A, 5B:
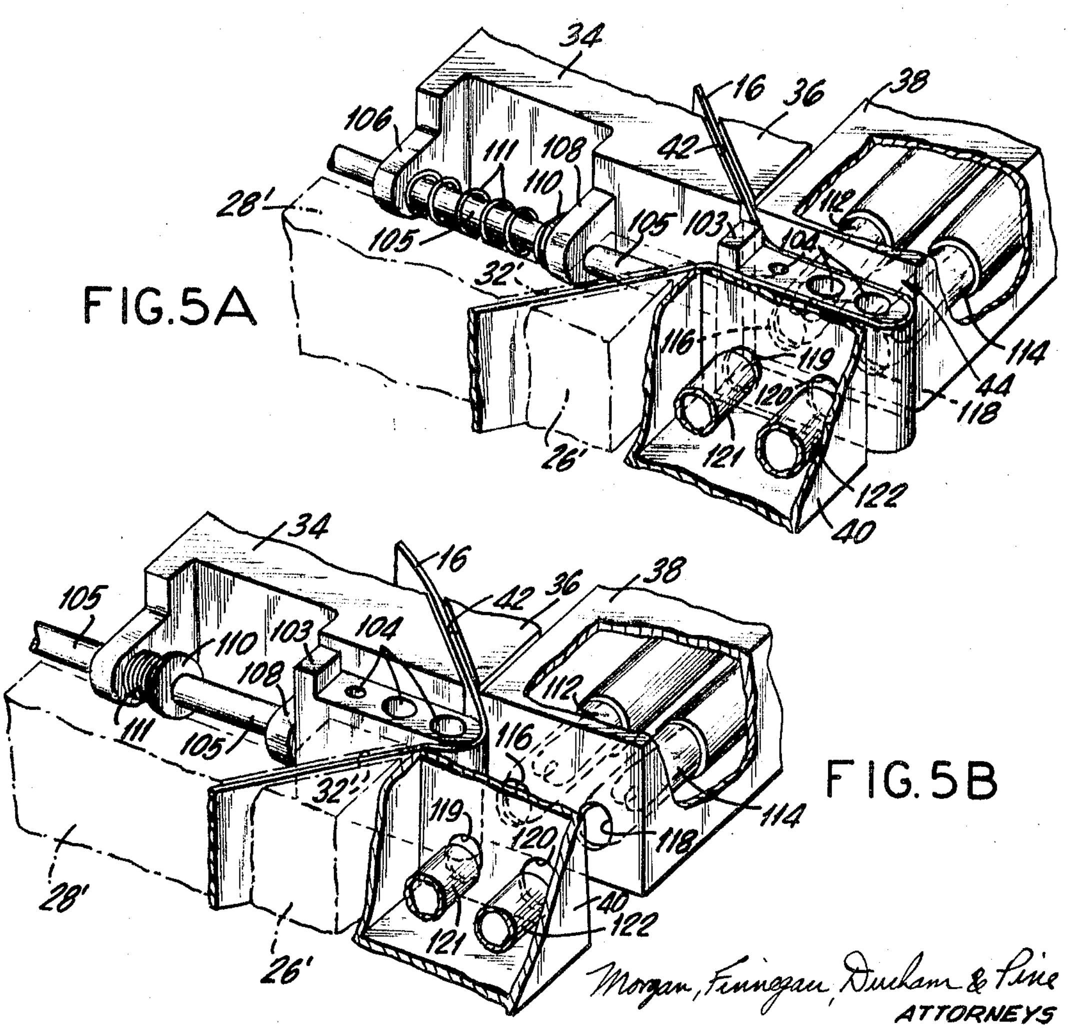
FIGURE 5A is a perspective view of a loop controlling mechanism for the magnetic tape illustrating the plunger in the extended position.
FIGURE 5B is a perspective view of the loop controlling mechanism illustrating the plunger in the retracted position.

Loop maintaining member 103 is secured to a shaft 105 which passes through a pair of apertures in projections 106 and 108 extending from positioning block 34. The apertures are aligned to permit reciprocal movement of the shaft from a position within channel 44 as shown in FIGURE 5A to a withdrawn position as shown in FIGURE 5B. A pressure plate 110 is secured to shaft 105 and an associated compression spring 111 is positioned between projection 106 and pressure plate 110 surrounding shaft 105. Pressure plate 110 is positioned on the shaft to limit travel of the plunger assembly when it abuts projection 108 as shown in FIGURE 5A. Travel in the opposite direction is limited when member 103 abuts the other side of projection 107.

When member 103 abuts projection 107, the tape is still partially within channel 44 and cannot be further withdrawn from the channel. As the tape loop increases in size, the plunger assembly moves outwardly forcing the tape loop into the adjacent tape storage area.

The inner portion of channel 44 lies between the pair of housings 33 and 40. A pair of electrical sockets are mounted in housing 38 to position a pair of light bulbs 112 and 114 in alignment with apertures 116 and 118 passing through one wall of channel 44. A pair of photoelectric cells 121 and 122 are mounted in housing 48 and are aligned with apertures 119 and 120 in the other wall of channel 44. Loop maintaining member 103 is opaque and therefore when fully extended (FIGURE 5A) blocks the passage of light to the photocells. When member 103 is partially withdrawn light passes through apertures 118 and 120 to activate photocell 122, and when it is fully withdrawn (FIGURE 5B) light also passes through apertures 116 and 119 to activate photocell 121. As will be described hereinafter, photocell 122 when activated indicates the "tight tape" condition and alters the motor control logic to maintain the minimum loop size. Photocell 121, when activated, slightly increases the speed of one of the motors in the transport systems to increase the tape loop size.

Figure 6:
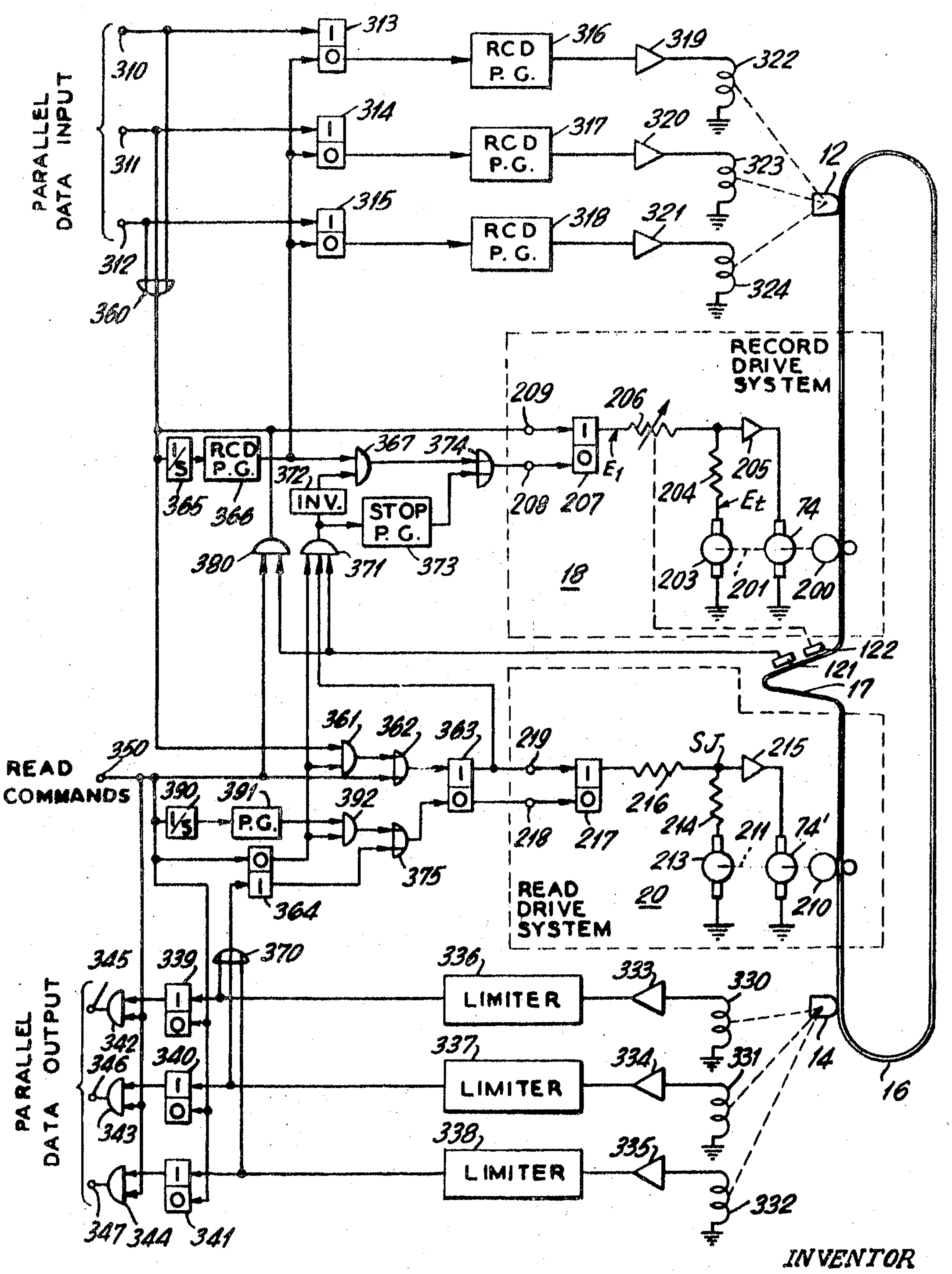
FIGURE 6 is a schematic diagram of the electrical system for controlling the dual transport system shown in FIGURES 1 and 2.

FIGURE 6 is a schematic diagram showing the motor control circuits, the recording circuits and the reading circuits.

The logic control circuits for tape transport systems 18 and 20 provide several modes of operation as follows:

(I) When the tape is empty and the first incoming character is received. a "tight tape" condition will exist and therefore both drive systems are energized. The character is recorded on the tape and advanced to the reading system where the character is read and transferred to a temporary output storage register.

(II) When a character is stored in the temporary output storage register and another incoming character is received, only the record drive system is energized and the character is recorded thereby increasing the size of tape loop.

(III) When a read command is received and a "tight tape" condition does not exist, the character in the temporary output storage register is transferred out and only the read drive system is energized until the next character is read from the tape and transferred to the output register.

(IV) When a read command is received and a "tight tape" condition does exist, the character in the output register is transferred out and both drive systems are energized until the next character is read and transferred to the output register thereby permitting all data to be removed from the tape.

For illustrative purposes the system in FIGURE 6 is shown as a multitrack system capable of recording three bit characters received in a parallel format whereas an actual system would be designed to handle characters usually consisting of five or more bits. The recording channels are shown at the top of FIGURE 6, the read channels are shown at the bottom, and the drive control logic circuits which provide the start and stop commands, and the drive systems which respond to these commands, are shown in the center portion of FIGURE 6.

The incoming data is applied to terminals 310–312 which are connected to the set inputs of flip flop circuits 313–315, respectively, which form an incoming data storage register. The reset outputs of flip flop circuits 313–315 are connected to record pulse generators 316–318, respectively. These pulse generators respond to the transient produced by the associated flip circuit during the transition from the set state to the reset state and provide corresponding record pulses. The record pulses are supplied to energize windings 322–324 in record heads 12 and pass via pulse amplifiers 319–321, respectively.

Thus, an incoming character is initially stored in flip flop circuits 313–315 which assume states corresponding to the respective bits of the incoming character, i.e. the associated flip flop circuit is placed in the set state if the incoming bit is a "one," and remains in the reset state if the incoming bit is a "zero." When a reset pulse is applied to the reset inputs of flip flop circuits 313–315, a transient is produced by the flip flop circuits then in the set state and pulse generators 316–318 respond to these transients to produce corresponding pulses which in turn energize selected ones of windings 323–324 to record the character on the tape.

The reading channels include windings 330–332 associated with the individual read heads 14 associated with the individual tracks on tape 16. Windings 330–332 are connected to the set inputs of flip flop circuits 339–341 via pulse amplifiers 333–335 and pulse shaping, limiter circuits 336–338, respectively. The set outputs of the flip flop circuits are each connected to an input of an associated AND circuit 342–344, respectively, and the outputs of these AND circuits are connected, respectively, to output terminals 345–347. Terminal 350 receives read commands from an external source and is connected to the other inputs of AND circuits 342–344 as well as the reset inputs of flip flop circuits 339–341.

When a character is detected on tape 16, selected ones of windings 330–332 are energized to in turn place corresponding ones of flip flop circuits 339–341 in the set state. Flip flop circuits 339–341 form the temporary output storage register and accordingly assume states corresponding to the character read from the tape, that is, a flip flop circuit is placed in the set state if the corresponding detected bit is a "one" and remains in the reset state if the corresponding bit is a "zero" (indicated by the absence of a magnetic mark in the tape). Those of AND circuits 342–344 associated with the flop flop circuits which are in the set state are conditioned and, therefore, when a read pulse is applied to terminal 350 it passes through the conditioned ones of the AND circuits. Accordingly, the character temporarily stored in the output register is transferred to output terminals 345–347. The same read pulse applied to terminal 350 resets flip flop circuits 339–341 and thereby places the register in condition for receiving the next character from the tape.

Drive motor 74 in the record drive system is a high performance DC motor preferably of the printed circuit type including an armature with an annular array of printed conductors supported on a dielectric disk carrier. The armature of this motor does not include iron and therefore has a very low mechanical inertia, is essentially inductionless, produces a high pulse torque, and has acceleration-deceleration characteristics which are linear with respect to applied current. A capstan arrangement 200 (pulley 78, drive belt 80 and associated components shown in FIGURES 1 and 2) is coupled to the motor shaft 201 and is maintained in constant, nonsliding, frictional engagement with magnetic tape 16. A speed sensing tachometer 203 is also coupled to motor shaft 201 and produces a potential $E_t$ which is directly proportional to the motor speed and tape velocity.

The start and stop commands for the motor drive system are applied to the set and reset inputs of a flip flop circuit 207 via terminals 209 and 208, respectively. When the flip flop circuit is in the set state, as occurs in response to a start command, a positive drive signal $E_1$ appears at the set output and is coupled to a summing junction SJ via a variable resistor 206.

The tachometer feedback signal $E_t$ from tachometer 203 is coupled to the summing junction via a resistor 204. Tachometer 203 is connected to provide a negative signal to summing junction SJ whereas flip flop circuit 207, when in the set state, is designed to provide signal $E_1$ which is positive.

A saturable drive amplifier 205 receives its input signal from the summing junction and is connected to energize drive motor 74. In response to a positive input signal exceeding a selected magnitude, the amplifier goes into saturation in one direction and provides a positive current pulse for rapidly accelerating the motor. In response to a negative input signal exceeding a similar preselected magnitude, the amplifier goes into the opposite state of saturation and provides a negative current pulse for rapidly decelerating the motor. The amplifier has a linear response range between the saturated states and operates as a linear servo amplifier when the input signal is insufficient to drive the amplifier into saturation. Thus, saturable amplifier 14 acts as a pulse generator to provide acceleration and deceleration pulses, and also acts as a linear servo amplifier.

When a start command is applied to terminal 209, flip flop circuit 6 is placed in the set state and therefore a positive drive signal $E_1$ is provided and coupled to the summing junction via resistor 206. The system is initially at rest and therefore the tachometer feedback signal $E_t$ is initially zero. Amplifier 205 responds to the large positive drive signal $E_1$ and is driven into saturation thereby providing a maximum current for energizing motor 74. As the motor accelerates, an increasingly negative voltage $E_t$ is provided by tachometer 203, which is in opposition to drive signal $E_1$ and therefore gradually decreases the magnitude of the signal at the summing junction. However, the summing junction signal remains sufficiently large to maintain amplifier 205 in saturation and therefore the amplifier provides maximum accelerating current to the motor throughout the acceleration interval. As the preselected running speed, for example, four inches per second, is approached, the summing junction signal is reduced to a value which permits amplifier 205 to operate in its linear range. At the running speed the tachometer feedback signal is equal to drive signal $E_1$ except for a small difference which provides the error signal at the input of the amplifier. The servo operation of the system then maintains the motor at a speed in accordance with the magnitude of drive signal $E_1$.

The system continues to run at the servo controlled speed until a stop command is applied to terminal 208. The stop command returns flip flop circuit 207 to the reset state and therefore drive signal $E_1$ falls to zero. The large negative tachometer feedback signal $E_t$ is still present at the summing junction and therefore amplifier 205 is driven into negative saturation to provide maximum reverse current to decelerate motor 74. As the motor decelerates, the tachometer feedback signal decreases but is still sufficient to maintain the amplifier in saturation throughout most of the deceleration interval until the motor comes to a stop.

Resistor 206 coupling the set output of flip flop circuit 207 to the summing junction is a light responsive resistor forming part of the photoelectric detection circuit 122. Under conditions where both drive systems are simultaneously energized, it is possible for the read drive systems to advance the tape slightly faster than the record drive system which could bring about a condition where tape loop 17 is decreased beyond the minimum permissible size. Under these conditions a light beam strikes resistor 206 which in turn decrease its resistance value to thereby increase the magnitude of the energizing signal applied to the summing junction at the input of amplifier 205. The servo controlled speed of the record drive system increases accordingly to thereby prevent tape loop 17 from decreasing beyond the minimum permissible size.

The read drive system is the same as the record drive system and the components thereof are designated with reference characters 210–219 corresponding to reference characters 200–209, respectively.

The portion of the control logic circuits which provides the start commands to both drive systems in response to the first incoming character (Mode I) include OR circuit 360, AND circuit 361, OR circuits 362 and 375 and flip flop circuits 363 and 364. Terminals 310–312 which receive the incoming data character are connected to the inputs of OR circuit 360. The output of OR circuit 360 is connected directly to terminal 209 in the record drive system and is also connected to one input of a two input AND circuit 361. The set output of flip flop circuit 364 is connected to the reset input of flip flop circuit 363 via OR circuit 375, and the reset output of flip flop circuit 364 is connected to the other input of AND circuit 361. The output of the AND circuit 361 is connected to the set input of flip flop circuit 363 via OR circuit 362. The set and reset outputs of flip flop circuit 363 are connected to the set and reset inputs, respectively, of flip flop circuit 217 via terminals 219 and 218, and hence, flip flop circuit 217 will always assume the same state as flip flop circuit 363.

Under mode I conditions, tape 16 is empty and the temporary output storage register including flip flop circuits 339–341 is likewise empty. Under these circumstances, flip flop circuit 364 is in the reset state and therefore AND circuit 361 is conditioned. When the first character is applied to terminals 310–312, at least one of the bits thereof is a "one" and therefore a pulse passes through OR circuit 360 and is applied to terminal 209 as a start command for the record drive system. The same pulse passes through conditioned AND circuit 361 and ON circuit 362 to place flip flop circuits 363 and 217 in the set state, and hence, the read drive system is also energized. Accordingly, in response to the first character both drive systems are energized and rapidly accelerate the tape to running velocity. Tape loop 17 remains in the "tight tape" condition.

After a suitable interval of time sufficient to permit the tape to achieve running speed, a record gap circuit including a one-shot circuit 365 coupled to a record pulse generator 366 provides a pulse which initiates the transfer of the character from the incoming data storage register to the tape. More specifically, the output of OR circuit 360 is connected to the input of one-shot circuit 365 which has a time constant selected so that the circuit remains in the activated state for a time interval slightly greater than that required for the tape to achieve running speed. Record pulse generator 366 responds to the transient produced by the one-shot circuit when it returns to the quiescent state. The output of pulse generator 366 is connected to the reset inputs of flip flop circuits 313–315, and therefore initiates the transfer of the data from the storage register to the tape after the tape has achieved running speed. As will be explained hereinafter, AND circuit 367 is not conditioned under these circumstances and therefore the pulse provided by pulse generator 366 is not supplied to terminal 208 as a stop command.

The stop command in mode I is provided when the first character has been read from the tape and transferred to the output storage register. The portion of the logic control circuits which provide the stop command include OR circuits 370, 374 and 375, flip flop circuits 363 and 364, AND circuit 371, and stop pulse generator 373. The outputs of limiter circuits 336–338 are connected to the inputs of OR circuit 370 which in turn is connected to the set input of flip flop circuit 364. Therefore, as data is transferred from the tape to the output storage register, a pulse will pass through OR circuit 370 to place flip flop circuit 364 in the set state. The set output of flip flop circuit 364 is coupled to the reset input of flip flop circuit 363 via OR circuit 375 and, therefore, when flip flop circuit 364 is placed in the set state, flip flop circuits 363 and 217 are placed in the reset state to thereby initiate deceleration of the read drive system.

The reset output of flip flop circuit 364, the set output of flip flop circuit 363 and photoelectric circuit 121 are connected to the three inputs of AND circuit 371. During the running condition in mode I, flip flop circuit 364 is in the reset state, flip flop circuit 363 is in the set state, and "tight tape" condition exists and, therefore, all inputs of AND circuit 371 are energized and a positive signal appears at the output of this AND circuit. The output of AND circuit 371 is coupled to one of the inputs of AND circuit 367 via an inverter circuit 372 and therefore during the running interval AND circuit 367 is not conditioned and therefore blocks pulses from pulse generator 366. When a character is transferred from the tape to output storage register 339–341, flip flop circuit 364 is placed in the set state thereby removing one of the input signals to AND circuit 371 and therefore the output of AND circuit 371 falls to zero. Stop pulse generator 373 is connected to the output of AND circuit 371 and responds to this transient to produce a pulse which passes through OR circuit 374 to terminal 208 in the record drive system. This pulse serves as a stop command to initiate deceleration in record drive system.

Accordingly, when the character is transferred to the output register in mode I operation both the record and the read drive systems are de-energized and the tape decelerates.

The system operates in mode II when a character is stored in flip flop circuits 339–341 of the output register. Under these circumstances flip flop circuit 364 is in the set state and therefore AND circuit 361 is not conditioned. When an incoming character is applied to terminals 310–312 the data character is stored in the incoming data storage register and a pulse passes through OR circuit 360 and is applied as a start command to terminal 209 in the record drive system. Accordingly, the record drive system accelerates to the running speed. The pulse passing through OR circuit 360 is blocked by AND circuit 361 and therefore does not affect the read drive system. The pulse passing through OR circuit 360 does reach one-shot circuit 365 which is then placed in the active state for a period of time sufficient to permit the tape to accelerate. After the tape has accelerated to running speed, pulse generator 366 provides an output pulse which resets flip flop circuits 313–315 and therefore transfers the data character to the tape. Since a character is already present in the output register, flip flop circuit 364 is in the set state and therefore one of the inputs is absent at AND circuit 371. The output of the AND circuit is zero and therefore inverter circuit 372 provides a positive signal to condition AND circuit 367. The pulse from pulse generator 366 therefore not only transfers the data from the incoming storage register to the tape, but also passes through AND circuit 367 and OR circuit 374 so that it is applied as a stop command to terminal 208. Accordingly, in a mode II operation the record drive system operates independently of the read drive system and increases the size of tape loop 17 as successive characters are recorded.

A mode III type operation is initiated in response to a read command applied to terminal 350 when a "tight tape" condition does not exist. The read pulse applied to terminal 350 passes through those of AND circuits 342–344 which are conditioned by the corresponding flip flop circuits 339–341 in the temporary output storage register, and thus, the character stored in the register is transferred to output terminals 345–347. The same read command resets flip flop circuits 339–341 and flip flop circuit 364. The same read command also passes through OR circuit 362 to place flip flop circuits 363 and 217 into the set state and therefore the read drive system accelerates to running speed.

Shortly after the tape has reached running speed a character is detected and transferred to the output storage register 339–341. As this occurs, a pulse passes through OR circuit 370 and places flip flop circuit 364 in the set state which in turn places flip flop circuits 363 and 217 in the reset state to initiate deceleration of the read drive system.

The system is designed so that all data record on the tape can be retrieved including the data existing between recording heads 12 and reads heads 14 when a "tight tape" conditon exists. In order to advance the tape without decreasing the size of tape loop 17 it is necessary that both drive systems be energized to advance the tape in response to a read command, this being the mode IV situation. The read command applied to terminal 350 passes directly to the set input of flip flop circuit 363 via OR circuit 362 and therefore places flip flop circuits 363 and 217 in the set state to initiate acceleration of the read drive system. A start command for the record drive system is supplied via AND circuit 380. Terminal 350 is connected to one input of AND circuit 380 and the output of photoelectric circuit 121 which provides a positive signal in the "tight tape" condition is connected to the other input of the AND circuit. The output of AND circuit 380 is connected to terminal 209. Thus, when a "tight tape" condition exists, AND circuit 380 is conditioned and therefore read command pulses are applied to initiate acceleration in both drive systems.

During the following run interval a "tight tape" condition continues to exist, flip flop circuit 363 is in the set state, and flip flop circuit 364 is in the reset state. Therefore, all inputs of AND circuit 371 are energized. However, as soon as a character is detected and transferred to the output register, flip flop circuit 364 is placed in the set state removing one of the inputs of AND circuit 371 which causes the output of the AND circuit to fall to zero. Stop pulse generator 373 responds to this transient and produces a pulse which passes via OR circuit 374 to provide a stop command at terminal 208. When flip flop circuit 364 returns to the set state, a signal passes through OR circuit 375 placing flip flop circuits 363 and 217 in the reset state to decelerate the read drive system. Accordingly, both drive systems receive a stop command when the character is detected and transferred to the output registers.

It is possible for a read command to be received when the tape is empty and therefore both drive systems would be energized to search for a data character which does not exist. Under these conditions one-shot circuit 390 and pulse generator 391 provide the stop commands. Terminal 350 is coupled to the input of one-shot circuit 390 which is placed in the active state for a period of time sufficient to permit the portion of tape 16 between heads 12 and 14 to advance past the read heads. Pulse generator 391 responds to the transient produced by the one-shot circuit when returning from the active state to the quiescent state and produces a corresponding pulse which is supplied to one input of an AND circuit 392. The reset output of flip flop circuit 364 is connected to the other input of AND circuit 392, and the output of the AND circuit is coupled to the reset input of flip flop circuit 363 via OR circuit 375. Thus, if a data character is not detected and flip flop circuit 364 remains in the reset state when a pulse is produced by pulse generator 391, AND circuit 392 is conditioned and the pulse passes through to reset flip flop circuits 363 and 217 which in turn resets flip flop circuit 207 via AND circuit 371, pulse generator 373 and OR circuit 374.

What is claimed is:

1. In a tape transport system for a transducer head disposed for contact with the tape, the improvement comprising a drive belt for frictionally engaging and conveying the tape into contact with and across the head, tensioning means engaging and maintaining said drive belt under controlled tension for controlling the contact pressure between the head and the tape, tape guide means for feeding the tape into frictional engagement with said belt, drive means engaging said belt for driving said belt across the head, and stationary guide means between the head and the tape to maintain the tape free of loops as it crosses the head.

2. In a bi-directional tape transport system for a read and/or write head disposed for contact with said tape, the improvement which comprises a drive belt for engaging and conveying the tape into contact with and across the head in either direction, tape guide means for feeding the tape into engagement with said belt regardless of the direction of belt movement, a drive member in constant frictional contact with said belt, means for energizing said member to drive said belt in a selected direction, and said belt being symmetrically disposed relative to the head to provide the same frictional driving contact between the tape and belt on one side of the head as the other.

3. In a bi-directional tape transport system for a read-write head disposed for contact with said tape, the improvement which comprises a drive belt symmetrically disposed relative to the head for frictionally engaging and uniformly conveying the tape into contact with and across the head in either direction, tape guide means symmetrically disposed on each side of the head for uniformly feeding the tape into engagement with said belt regardless of the direction of belt movement, tensioning means symmetrically disposed relative to the head engaging and maintaining said drive belt under controlled tension for uniform contact pressure between the head tape regardless of the direction of belt movement, a drive member in constant frictional contact with said belt, and means for energizing said member to drive said belt in a selected direction.

4. In a tape transport system, the improvement which comprises a pair of opposing recording and reading heads each disposed to contact a continuous length of tape, a bi-directional drive belt for each of said heads which carries said tape into contact with and across the associated one of said heads, a pair of tape guide means for each of said belts symmetrically placed on each side of said head for feeding said tape into engagement with said belt regardless of the direction in which said belt is moving, drive means for each belt in constant frictional contact therewith, and means for selectively energizing each of said drive means to move each drive in a selected direction.

5. In a tape transport system, the improvement which comprises a pair of opposing recording and reading heads each disposed to contact a continuous length of tape freely distributed on each side of said heads and including a tape loo ptherebetween, a bi-directional drive belt for each of said heads symmetrically disposed relative to the associated head for frictionally engaging and uniformly conveying the tape into contact with and across said associated head in either direction, a pair of tape guide means for each of said belts symmetrically placed on each side of the associated head for feeding the tape into frictional engagement with said belt regardless of the direction in which said belt is moving, tensioning means for each of said belts engaging and maintaining said belt under controlled tension for uniform contact pressure between the head and the tape regardless of the direction of belt movement, drive means for each belt in constant frictional contact therewith, means for selectively energizing each of said drive means to move each drive in a selected direction, and means on one side of said heads for maintaining the tape loop between said heads.

6. The tape transport system set forth in claim 5, wherein the means for maintaining said tape loop include a retractable plunger on one side of said heads and between said drive belts which in the extended position engages the tape loop before said loop contacts said belts, and electrical circuit means coupled to said record drive energizing means for activating the drive means as the plunger is retracted by said tape loop for increasing the size of said tape loop.

7. In a tape transport system for a transducer head disposed for contact with the tape; the improvement comprising a continuous drive belt for frictionally engaging and conveying the tape into contact with and across the head; drive means including a pulley maintained in constant frictional engagement with a portion of said continuous belt, and a low inertia motor means coupled to said pulley; belt guide means on each side of the head around which said continuous belt passes; tensioning means engaging said continuous belt on each side of the head between said belt guide means and said pulley to provide balanced belt tension and to maintain said drive belt under controlled tension for controlling the contact pressure between the head and the tape; and tape guide means for feeding the tape into frictional engagement with said belt.

8. In a tape transport the combination of; a magnetic transducer; a pair of guide rollers symmetrically disposed relative to said transducer; a continuous drive belt for frictionally engaging a magnetic tape and conveying the tape at least partially around said guide rollers and across said transducer; drive means for engaging said drive belt and driving said belt around said guide rollers and across said transducer; and symmetrical tensioning means engaging said drive belt and maintaining said drive belt under controlled tension for controlling the contact pressure between said transducer and the tape and to control the frictional engagement between the tape and said belt as the same passes around said guide rollers and across said transducer.

References Cited

UNITED STATES PATENTS

| | | | |
|---|---|---|---|
| 3,114,512 | 12/1963 | Peshel | 242—55.12 |
| 3,244,341 | 4/1966 | Gilman | 226—188 |

M. HENSON WOOD, Jr., Primary Examiner

RICHARD A. SCHACHER, Assistant Examiner

U.S. Cl. X.R.

226—170